US008984526B2

(12) United States Patent
Garg et al.

(10) Patent No.: US 8,984,526 B2
(45) Date of Patent: Mar. 17, 2015

(54) DYNAMIC PROCESSOR MAPPING FOR VIRTUAL MACHINE NETWORK TRAFFIC QUEUES

(75) Inventors: Pankaj Garg, Bellevue, WA (US); Alireza Dabagh, Kirkland, WA (US); Meiying Li, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 227 days.

(21) Appl. No.: 13/415,856

(22) Filed: Mar. 9, 2012

(65) Prior Publication Data

US 2013/0239119 A1 Sep. 12, 2013

(51) Int. Cl.
*G06F 9/46* (2006.01)
*G06F 9/50* (2006.01)

(52) U.S. Cl.
CPC ...... *G06F 9/5083* (2013.01); *G06F 2209/5019* (2013.01); *G06F 2209/5022* (2013.01)
USPC .............................................. 718/105; 718/1

(58) Field of Classification Search
None
See application file for complete search history.

(56) References Cited

U.S. PATENT DOCUMENTS

| | | | |
|---|---|---|---|
| 6,625,161 B1 * | 9/2003 | Su et al. .................. 370/415 |
| 6,651,082 B1 * | 11/2003 | Kawase et al. ............... 718/105 |
| 7,219,121 B2 | 5/2007 | Kaniyar et al. |
| 7,773,504 B2 | 8/2010 | Chew et al. |
| 7,836,195 B2 * | 11/2010 | Veal et al. .................... 709/231 |
| 7,929,433 B2 * | 4/2011 | Husak et al. .................. 370/229 |
| 7,996,484 B2 * | 8/2011 | Mundkur et al. ............. 709/213 |
| 8,346,999 B2 * | 1/2013 | Dubal et al. .................... 710/52 |
| 8,352,946 B2 * | 1/2013 | Srivatsa et al. ................ 718/102 |
| 2004/0260829 A1 * | 12/2004 | Husak et al. .................. 709/232 |
| 2006/0020701 A1 * | 1/2006 | Parekh et al. ................. 709/226 |
| 2009/0019449 A1 * | 1/2009 | Choi et al. .................... 718/105 |
| 2011/0142064 A1 | 6/2011 | Dubal et al. |
| 2012/0266175 A1 * | 10/2012 | Zheng .......................... 718/103 |

OTHER PUBLICATIONS

"Intelligent Queueing Technologies for Virtualization", Retrieved at <<http://www.intel.com/content/dam/doc/white-paper/intelligent-queueing-technologies-for-virtualization-dell-paper.pdf>>, Retrieved Date: Nov. 15, 2011, pp. 4.

Fusco, et al., "High Speed Network Traffic Analysis with Commodity Multi-core Systems", Retrieved at <<http://conferences.sigcomm.org/imc/2010/papers/p218.pdf>>, internet Measurement Conference, Nov. 1-3, 2010, pp. 218-224.

(Continued)

*Primary Examiner* — Van Nguyen
(74) *Attorney, Agent, or Firm* — John Jardine; Kate Drakos; Micky Minhas

(57) ABSTRACT

An algorithm for dynamically adjusting the number of processors servicing Virtual Machine Queues (VMQ) and the mapping of the VMQ to the processors based on network load and processor usage in the system. The algorithm determines the total load on a processor and depending on whether the total load exceeds or falls below a threshold respectively, the algorithm moves at least one of the VMQs to a different processor based on certain criteria such as whether the destination processor is the home processor to the VMQ or whether it shares a common NUMA node with the VMQ. By doing so, better I/O throughput and lower power consumption can be achieved.

20 Claims, 7 Drawing Sheets

(56) References Cited

OTHER PUBLICATIONS

Shi, et al., "An Adaptive Load Balancer for Multi-processor Routers"; Retrieved at <<http://citeseerx.ist.psu.edu/viewdoc/download?doi=10.1.1.122.911&rep=rep1&type=pdf>>, SPECTS, San Jose, CA, Jul. 2004, pp. 671-879.

"Improving Network Performance in Multi-Core Systems", Retrieved at <<http://www.intel.com/content/dam/doc/white-paper/improving-network-performance-in-multi-core-systems-paper.pdf>>, Retrieved Date: Nov. 15, 2011, pp. 4.

* cited by examiner

DYNAMIC PROCESSOR MAPPING FOR VIRTUAL MACHINE NETWORK TRAFFIC QUEUES

BACKGROUND

When a computer system utilizes multiple processors to process network traffic received from network interface cards (NICs), the NICs distribute the processing of the traffic by interrupting the processors when the NIC receives the network packets. These packets are typically collected in a queue, and based on some predetermined criteria such as a Media Access Control (MAC) address, they are directed to a processor that matches the criteria.

It is not uncommon for a NIC to be serviced by multiple processors. One NIC may contain multiple queues and each queue is associated with a single processor. Typically, the total number of processors and the way that they are mapped, to queues are static during runtime. Generally, a static configuration cannot adjust to the change in network load, which may lead to a suboptimal system performance.

A static configuration is particularly troublesome when too many queues with high network traffic are mapped to too few processors, which often results in a processor bottleneck and lower throughput. Additionally, when queues with light network load are statically mapped to too many processors, the system will utilize processors unnecessarily and waste processing power. Thus, when both the number of processors and the network queue mapping scheme to those processors are static, the system may not run in the most efficient manner.

SUMMARY

An embodiment of a method for dynamically utilizing and mapping network traffic queues to multiple processors in a computer is provided herein. When multiple processors service a given number of queues that receive network packets from a NIC, each queue can be dynamically mapped to a processor by a filter that examines the runtime status of the network load and usage of the processors in the system. Because these queues originate from the same NIC, the queues share the same interrupt resource.

The filter allows the operating system to utilize the common interrupt resource to scale up and use more processors under times of high network load conditions by moving a queue from an overloaded processor to a processor that has available load capacity that would not exceed a threshold load after the move. Likewise, under low network load conditions, the filter can move a queue from a processor with a small load to a processor that has the capacity to process a greater load without exceeding the threshold load after the move. A processor is more desirable to receive a queue if it is considered either a home processor for the queue, which is the processor that is preferred processor for the queue, or a processor that shares a common non-uniform memory access (NUMA) node with the VM the queue belongs to, or a processor that shares the cache preferred processor for the queue.

The summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWING FIGURES

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION OF ILLUSTRATIVE EMBODIMENTS

The following description illustrates a process of managing data in a computer containing multiple processors that are utilized to process data throughput from network interface cards in multiple virtual machine queues ("VMQ"). When one of the processors is either over or under-utilized by handling too many, or too few queues respectively, the description provides an algorithm to move a given queue to a different processor where the queue can be more efficiently processed.

Figure 5:
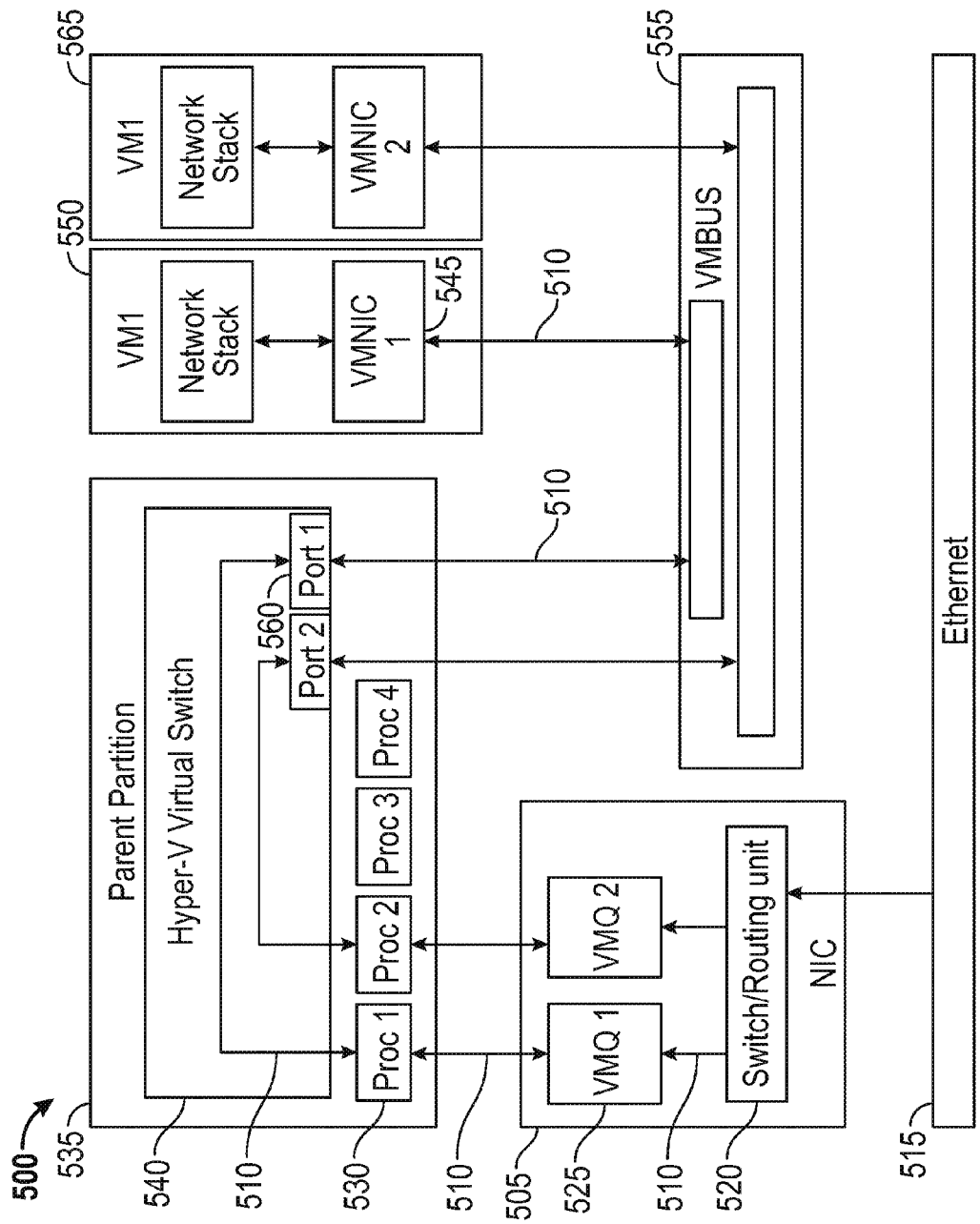
FIG. 5 is a diagram showing an operational environment in which the process operates.

An overview of the operational environment 500 of the process 100 is illustrated in FIG. 5. In a typical operational environment, a NIC 505 receives a data packet 510, which includes a MAC address, from an Ethernet connection 515. When the packet 510 arrives at the NIC 505, a switch/routing unit 520 forwards the packet 510 to a corresponding Virtual Machine Queue (VMQ) 525 on the NIC 505. Several VMQs may exist within the NIC 505. The data packet 510 is routed to a corresponding VMQ 525 according to the data packet's 510 destination MAC address. Each VMQ 525 is assigned to a corresponding CPU 530. When the VMQ 525 receives the data packet 510, the NIC 505 interrupts the CPU 530 that corresponds to the VMQ 525 and delivers the data packet 510 to a virtual switch 540 wherein the virtual switch 540 is included within a parent partition 540.

The CPU 530 processes any data packets resident in the virtual switch 540 received from the VMQ 525 and forwards the data packet 510 out of a data port 560 to a virtual machine NIC 545 that corresponds to the VMQ 525 via a virtual machine bus 555. The virtual machine NIC 545 is embedded within a virtual machine 550. Once the data packet 510 reaches the virtual machine NIC 545, it is then forwarded to a network stack 565 within the virtual machine 550.

Figure 1:
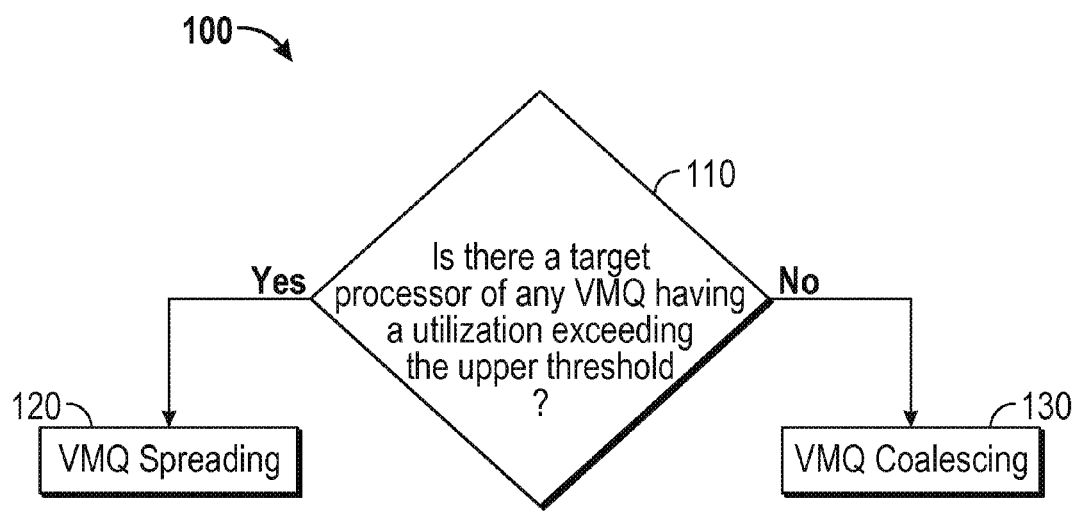
FIG. 1 is a flowchart illustrating steps and conditions to utilize an embodiment of intelligent interrupt balancing.

Referring to FIG. 1, the process 100 first determines whether an existing processor is the target of any queue that has a utilization (or processor load) that exceeds an upper threshold (block 110) by calculating the load percentage on the processor and comparing it to the threshold. If the processor load exceeds the upper threshold, then the process will attempt to move the queues to other available processors that can accept the load from the queue without exceeding the threshold. This is otherwise known as VMQ Spreading (block 120). If the processor load does not exceed the upper threshold, then the process will attempt to consolidate queues from under-utilized processors to processors that make the system more efficient, otherwise known as VMQ Coalescing (block 130). Example processes of VMQ spreading and coalescing are illustrated in more detail in FIGS. 2 and 3 respectively.

Figure 2:
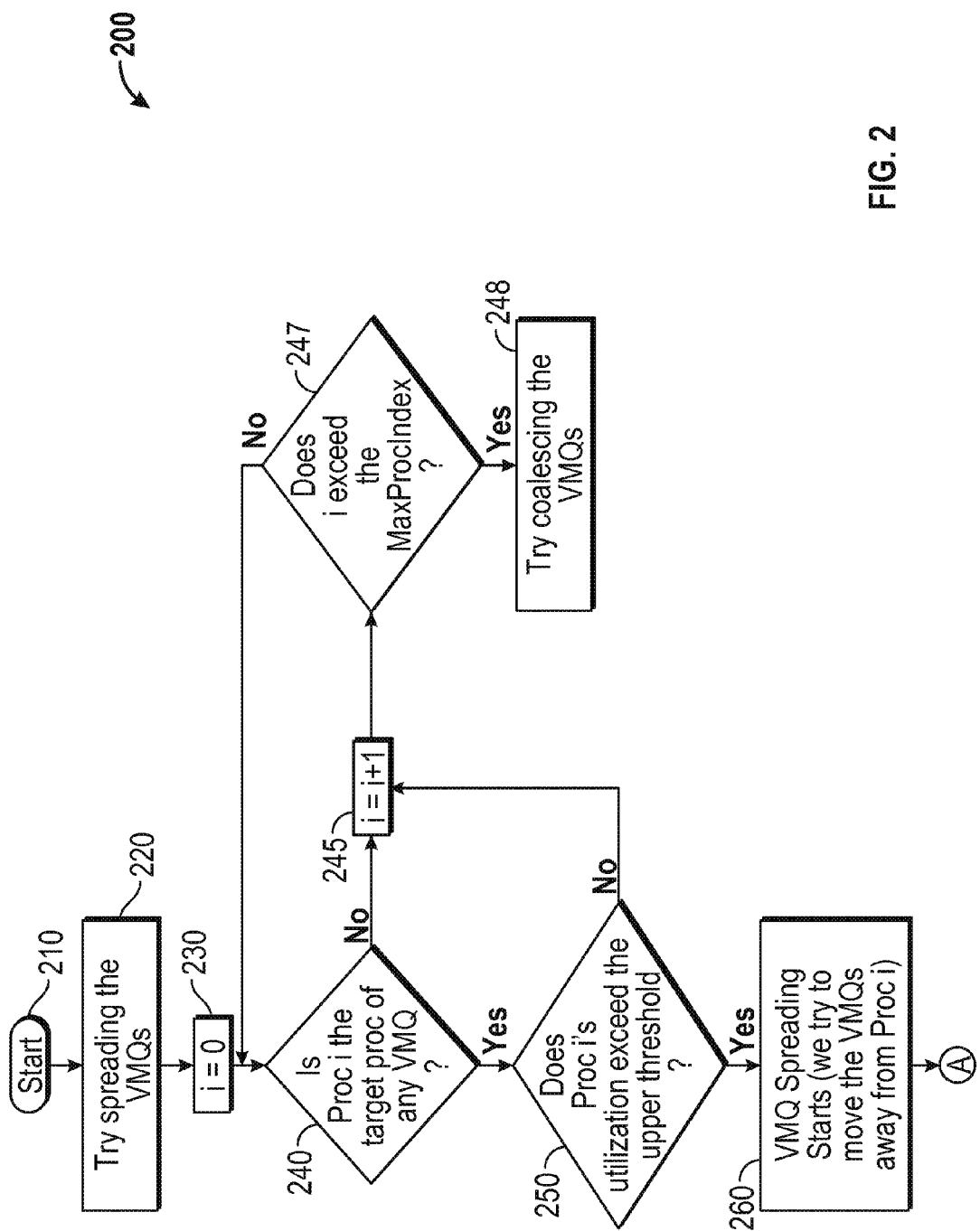
FIG. 2 is a flowchart illustrating steps and conditions to achieve virtual machine queue spreading under high processor loads.
Figure 2:
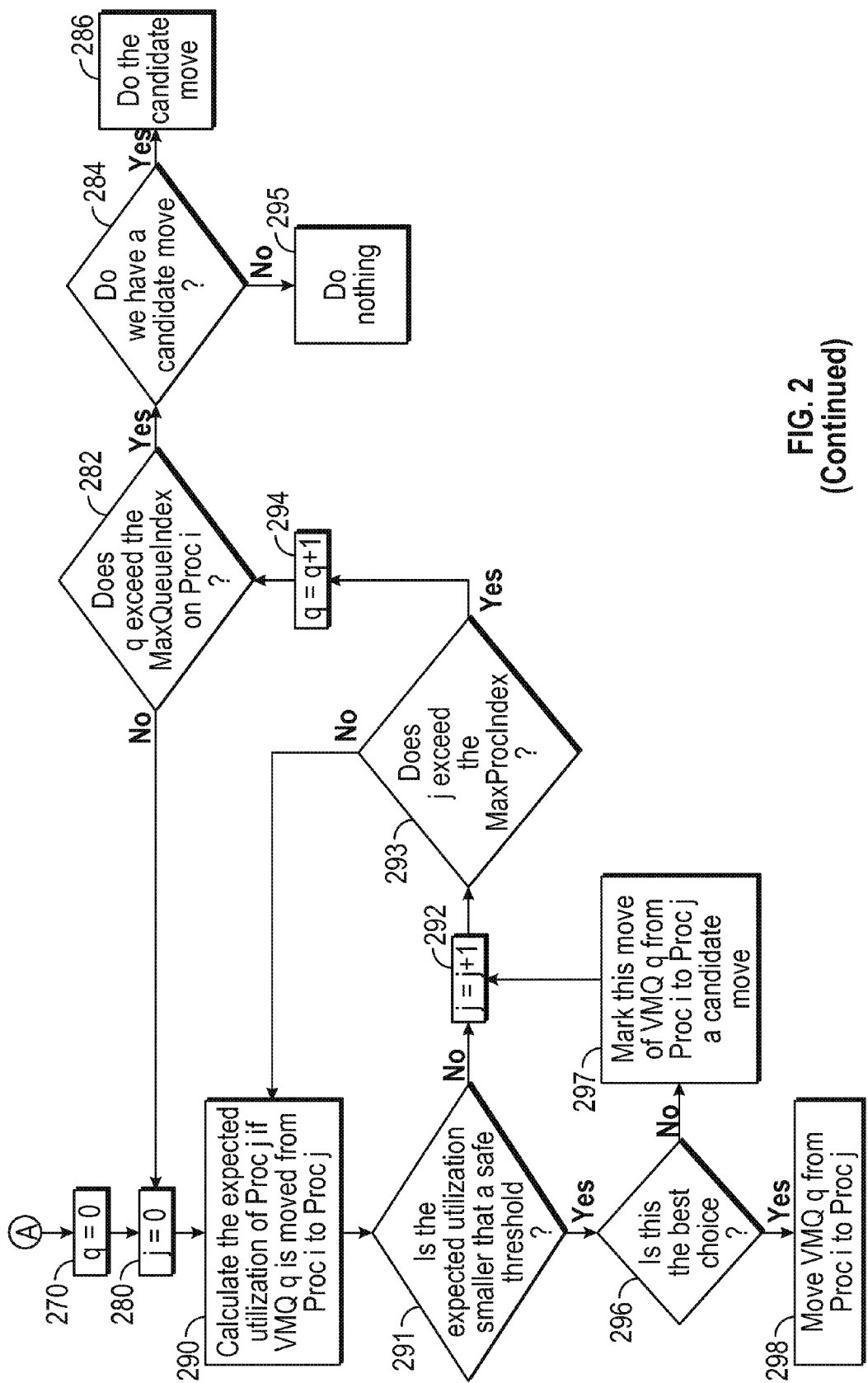

An example process of VMQ spreading is illustrated in FIG. 2. The process 200 illustrates a method of determining whether a queue will be reassigned from its current processor to another available processor. The process 200 first determines the number of available processors in the computer and decides whether the conditions exist to spread the load of any of the processors. The first processor is examined to see if any VMQ is assigned to it (FIG. 2, blocks 210, 220, 230, and 240). When a VMQ has been pre-assigned to a particular processor, it is considered to be a target processor. Usually, a target processor is the processor that is physically closest to the electronic path where the VMQ resides. If the processor is not a target, then the next processor is examined to see if there are any remaining suitable processors in the system (FIG. 2, blocks 245 and 247). The order in which the processors are examined can be predetermined, but the order is typically determined by choosing the nearest processor to the processor currently being examined. This is repeated until all processors in the computer system have been examined.

If all processors have been examined, then the system will check to see if the VMQs can be coalesced (FIG. 2, block 248). If, however, a processor is the target of a queue, then the overall load of the processor is ascertained to see if it exceeds a predetermined upper threshold (FIG. 2, blocks 240 and 250). The upper threshold can be any suitable value based, on a desired maximum load. Additionally, a processor may be the target of multiple queues. If the processor's total load does not exceed the upper threshold, then the process verifies whether all processors in the system have been examined (FIG. 2, blocks 250 and 245). If, however, the processor's total load does exceed the upper threshold, then the process of spreading begins (FIG. 2, blocks 250, 260, 270, and 280).

The process determines whether the resulting load of a destination processor, which is the candidate for receiving the queue, would exceed the upper threshold if the load of a queue on the source processor is moved to the destination processor (FIG. 2, blocks 290 and 291). If the resulting load on the destination processor would exceed the maximum threshold after moving the queue to the destination processor, then the process determines whether all available destination processors have been examined to determine their current loads (FIG. 2, blocks 291, 292, and 293). If a potential destination processor remains, then the next available destination processor is examined to determine what its total load would be after moving the queue (FIG. 2, blocks 293 and 290). This step is repeated until all potential destination processors have been considered (FIG. 2, blocks 290, 291, 292, and 293). If the total load on each potential destination processors would, exceed the threshold by adding the queue, then the process ascertains whether any other queues remain on the source processor (FIG. 2, blocks 294 and 282). If a queue can be moved to a destination processor and the resulting load on the destination processor does not exceed the total threshold, the system examines whether the destination processor is the best choice of the available processors (FIG. 2, blocks 291, 296 and 615).

In the preferred embodiment, it is desirable to choose a processor for a queue that is either physically closer to its home processor, or a processor that shares the same non-uniform memory access (NUMA) node with its home processor. In the case where multiple queues on a single processor can share a common interrupt vector, it may also be desirable to choose a processor for a queue that already has one or more queues mapped to it. By doing so, the system results in fewer processor interrupts and minimizes power consumption in the operational environment. Once the best available choice of processor is identified, the queue is moved from the source processor to the destination processor (FIG. 2, blocks 298, 284, and 286). If no viable candidate exists, then no move is made (FIG. 2, block 295).

Figure 4A:
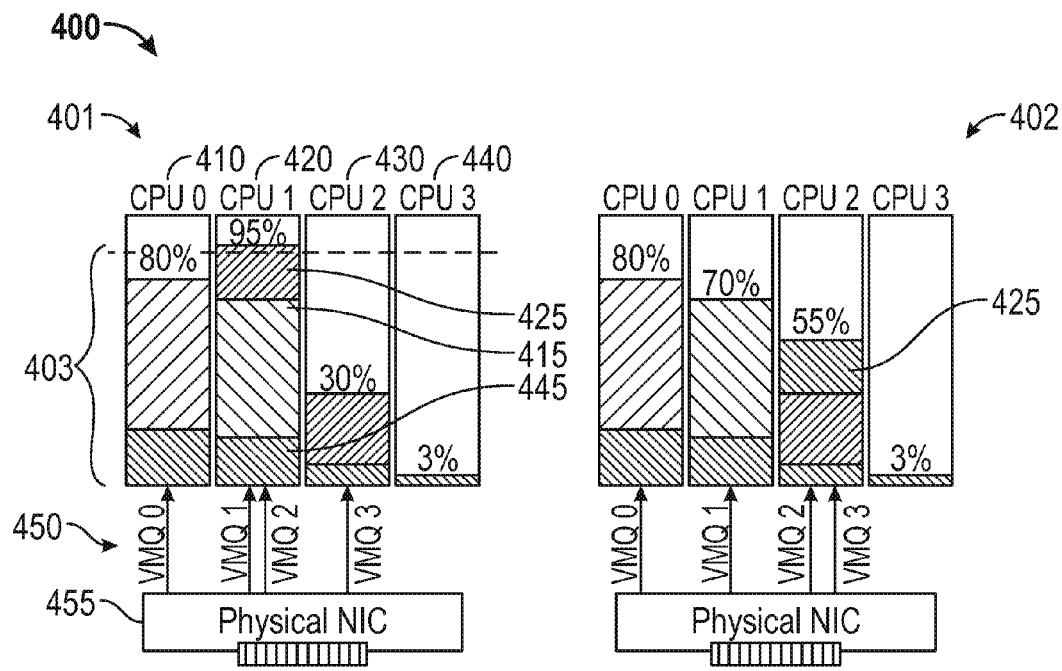
FIG. 4a is a diagram showing how virtual machine queue spreading occurs as shown in further support of FIG. 2.

FIG. 4a illustrates an example of how the spreading process 200 described in the flowchart of FIG. 2 works. FIG. 4a shows a current configuration 401 and a post-process configuration 402. As shown in the current configuration 401, a network interface card 455 has four VMQs 450 that receive incoming network packets from the card 455 with each VMQ targeted, to one of the corresponding CPUs 400 and with each CPU having a given load. The VMQs 450 typically default to their home processors, but this is not required as the VMQs 450 can be arbitrarily assigned to any suitable processor. In this example, the total load 403 of CPU1 420 exceeds the threshold 401 (FIG. 2, block 250).

The threshold 401 in FIG. 4a can be assigned any arbitrary value. In this example, it has been assigned a value of 90% of total capacity and CPU1 420 has two queues—VMQ1 415 and VMQ2 425 in addition to other load 445. The load of VMQ2 425 is 25% and has been determined to be a candidate to move to another CPU. The process 200 then examines the available capacity of the remaining CPUs 400 (FIG. 2, block 290). The CPUs 400 are typically examined in a round-robin fashion, but any order may be arbitrarily assigned so long as the CPUs 400 are considered, CPU0 410 is first considered. But because the addition of VMQ2's 425 load would not only exceed the threshold 401 of CPU0 410, it would exceed the total load capacity of CPU0 410 (FIG. 2, block 291). CPU2 430 is then considered (FIG. 2, block 292).

As shown in configuration 401, because the current load of CPU2 430 is only 30%, the addition of VMQ2's 425 load would cause the total load on CPU2 430 to only reach 55% (FIG. 2, blocks 290 and 291) as shown in configuration 402. This would make CPU2 430 a viable destination CPU. But before the final decision is made whether to move the VMQ2 425 load to CPU2 430, the process examines whether CPU2 430 is the best candidate (FIG. 2, block 296). In this example, because CPU2 430 is physically closer to its home CPU (CPU1 420) than CPU3 440, CPU2 430 is a more desirable destination CPU even though CPU3's 440 total load is less than CPU2's 430 load. With no other potential target CPUs left to consider, the load of VMQ2 425 is moved to CPU2 430 as shown in configuration 402 and the spreading process is complete.

Referring back to FIG. 1, if a processor's total load is below the upper threshold, then the process examines whether the one or more queues can be coalesced on a processor to raise the total load on a processor to a level below the upper threshold by having fewer processors operate at once. (FIG. 1 blocks 110 and 130). By doing so, a more efficient I/O throughput will occur and less power will be consumed.

Figure 3:
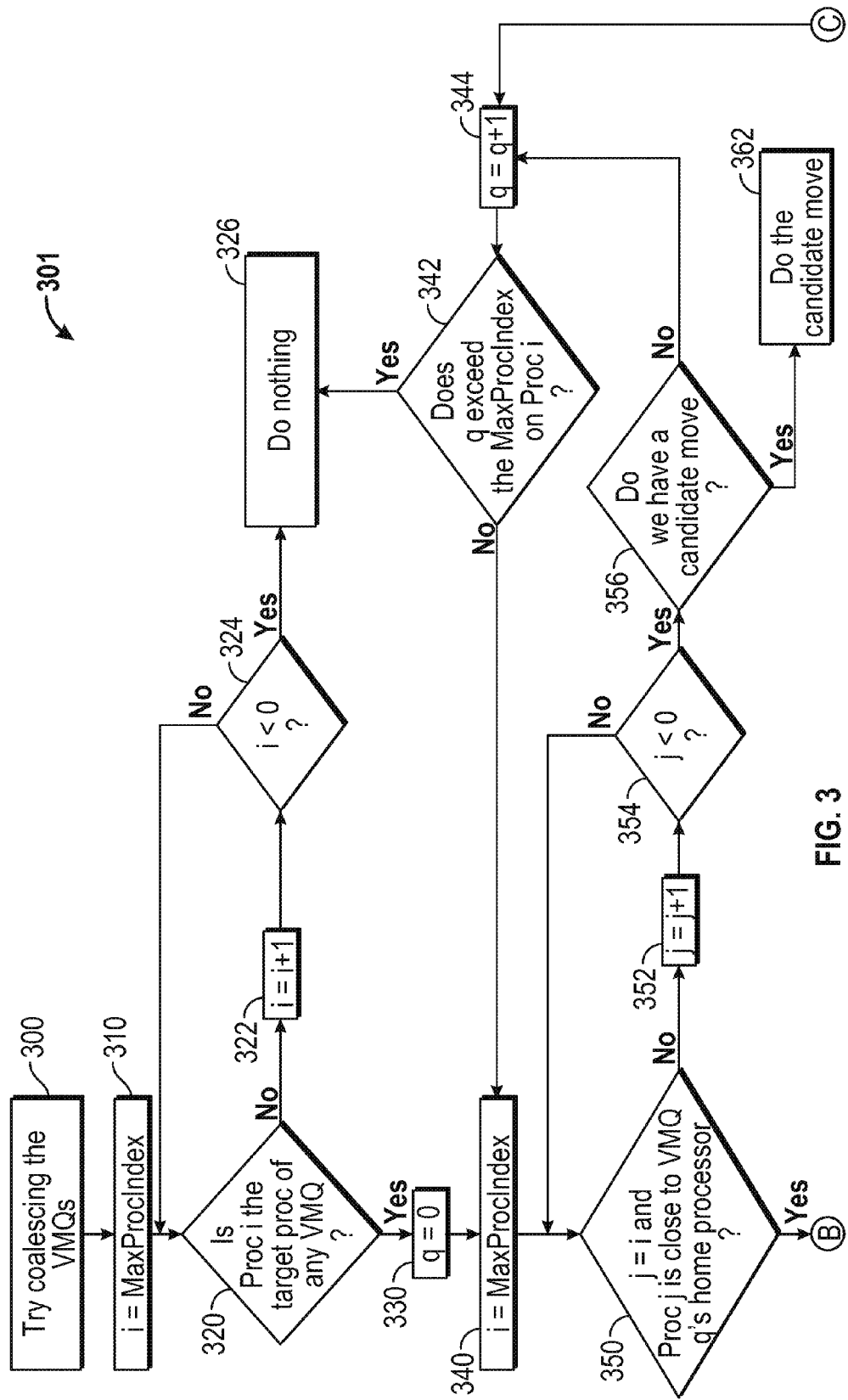
FIG. 3 is a flowchart illustrating steps and conditions to achieve virtual machine queue coalescing under low processor loads.
Figure 3:
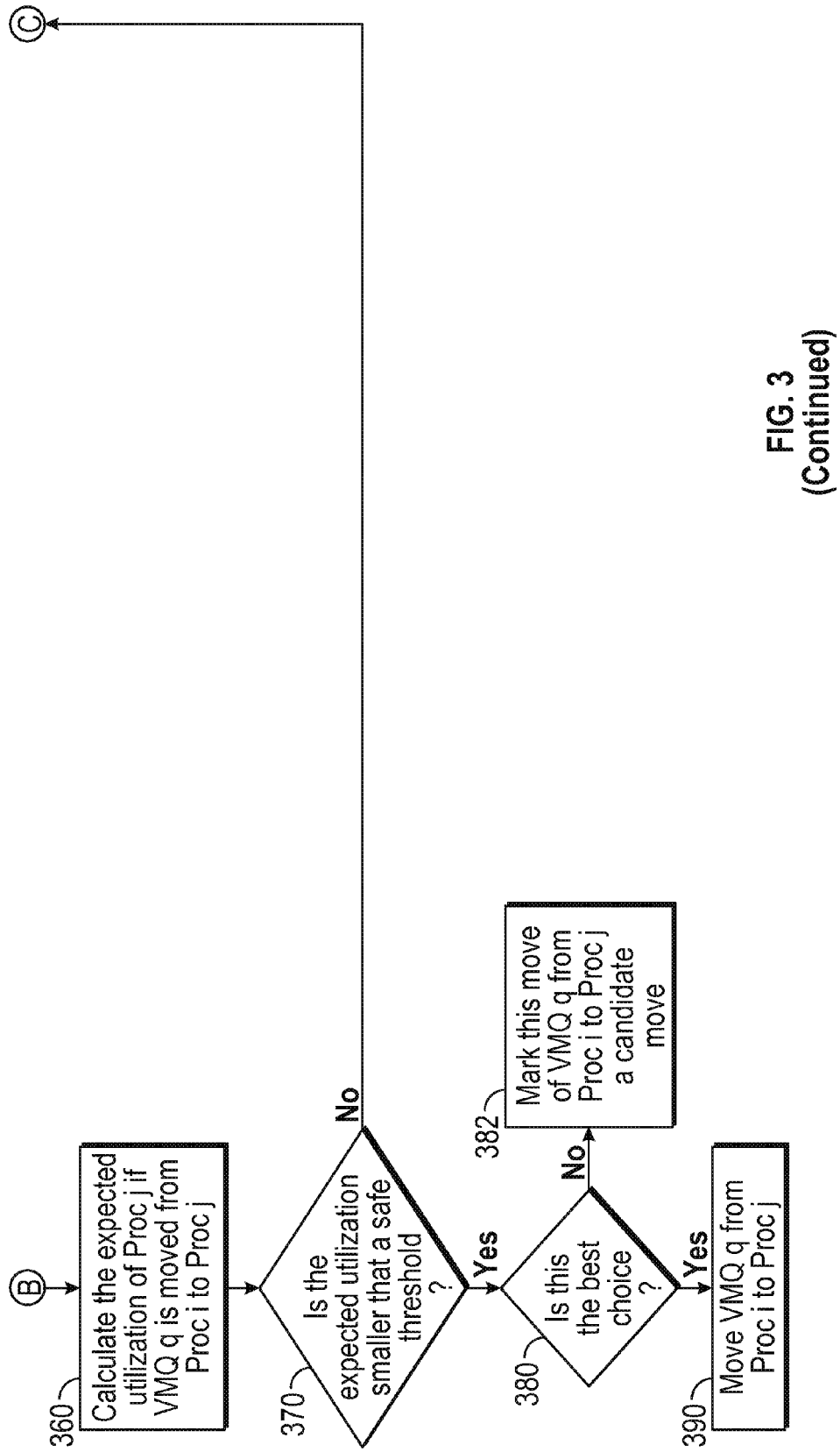

FIG. 3 illustrates the VMQ coalescing process 301 in detail (FIG. 3, block 300). The process 200 first determines the number of available processors in the computer and decides whether the conditions exist to coalesce the load of any of the processors. (FIG. 3, block 310). The first processor is examined to determine whether it is mapped to any queue (FIG. 3, block 320). If the processor is not mapped, to any queue, then the process determines if there are any remaining processors left to consider (FIG. 3, blocks 322 and 324). If there are no remaining processors available, then no queue is moved (FIG. 3, blocks 342, 324 and 326). But if there are any other processors left to consider, the next available processor is examined to see if it is the target of any queue (FIG. 3, blocks 324 and 320).

If the processor is a target of a queue, then the process 301 examines whether by moving the queue to the target processor, the queue would be moving closer to its home processor (FIG. 3, blocks 330, 340, and 350). If the target processor is not a processor that is closer to the queue's home processor, then the other remaining processors are checked to see if they are closer to the queue's home processor (FIG. 3, blocks 352 and 354). If a processor is determined to be one that would place the queue closer to its home processor, then it is considered a destination processor and the queue is a candidate to be moved to the destination processor (FIG. 3, blocks 356 and 362). If the queue is not a candidate for the move, then any other queues on the source processor are examined to see if they are candidates until all remaining queues on the source processor are considered (FIG. 3, blocks 356, 344, and 382).

Before the candidate queue is moved, the expected total load based on moving the queue to the destination processor is calculated (FIG. 3, block 360). If the expected total load is less than the upper threshold, and the destination processor is the best available processor, then the queue is moved from the source processor to the destination processor (FIG. 3, blocks 370, 380, and 390).

Figure 4B:
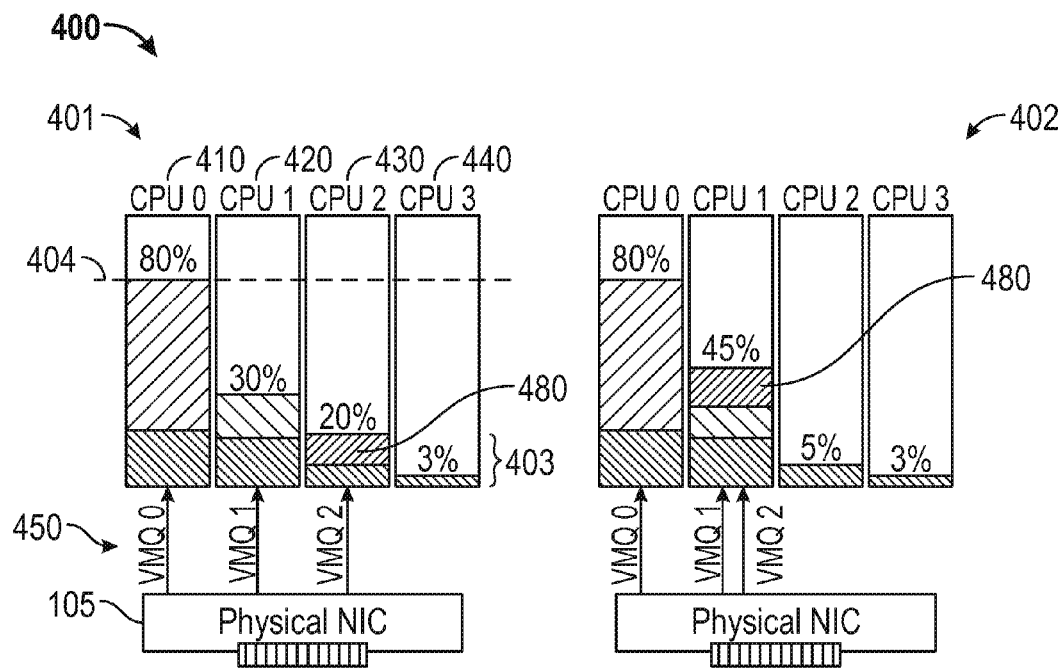
FIG. 4b is a diagram showing how virtual machine queue coalescing occurs as shown in further support of FIG. 3.

FIG. 4b illustrates the coalescing process 301 described in the flowchart of FIG. 3. FIG. 4b shows the current configuration 401 and the post-process configuration 402. As shown in the current configuration 401, the network interface card 455 has three VMQs 450 that receive incoming network packets from the card 455 with each VMQ 450 targeted to one of the corresponding CPUs 400 and with each CPU 400 having a given load (FIG. 3, blocks 320, 322, and 324). In this example, the total load 403 on CPU2 430 is 20%, which is far below the lower threshold 404. The lower threshold 404 is typically 80%, but can be set to any desired value lower than the upper threshold 401. At 20%, CPU2's 430 load 403 is a potential candidate for coalescence. CPU0 410 is then examined (FIG. 3, blocks 360 and 370). At 80%, the CPU0's 410 load is not below the lower threshold 404 and therefore is not considered a viable destination CPU. Next, CPU1 420 is examined. Because CPU1 420 has a total load of 30%, it is a potential destination CPU. The resulting load on CPU1 420 is then ascertained to see if by moving VMQ2's load 480 to CPU1 420, the resulting load would exceed the upper threshold 401. Since the resulting load would increase only to 45%, CPU1 420 is a suitable destination CPU candidate. After checking the only remaining CPU—CPU3 440—to see if it is a more suitable candidate (it is not because it is just as far away from VMQ2's 480 home CPU as CPU1 420), then CPU2 430 is examined to see if there are any remaining VMQs on CPU2 430 to move to CPU1 420. Since there are no remaining VMQs, VMQ2's load 480 is moved to CPU1 420 (FIG. 3, blocks 370, 380, and 390).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of dynamically adjusting a network traffic queue associated with at least one virtual machine queue to processor mapping comprising the steps of:
    determining whether a first load comprising a first virtual machine queue associated with a first virtual machine is present on a first processor;
    determining whether the first load exceeds an upper threshold for processor load on the first processor;
    determining a first resulting load on a second processor based on the first virtual machine queue and a second load on the second processor;
    moving the first virtual machine queue to the second processor when the first load exceeds the upper threshold and the first resulting load does not exceed the upper threshold for the second processor, wherein the second processor is a next physically closest processor to an electronic path upon which the first virtual machine queue resides; and
    wherein the proceeding steps are performed by at least one processor.

2. The method of claim 1 further comprising the steps of:
    determining whether the first load further comprises a second virtual machine queue associated with a second virtual machine, the second virtual machine being a different virtual machine from the first virtual machine;
    determining a second resulting load on the second processor based on the second virtual machine queue and the second load;
    determining if the second resulting load exceeds the upper threshold;
    moving the second virtual machine queue to the second processor if the first load exceeds the upper threshold and the second resulting load does not exceed the upper threshold.

3. The method of claim 2 wherein the second virtual queue is moved to the second processor when the first virtual machine queue and second virtual machine queue share a common interrupt vector.

4. The method of claim 1 wherein the first virtual machine queue is moved from the first processor to the second processor when the second processor is a home processor of the first virtual machine queue.

5. The method of claim 1 wherein the first virtual machine queue is moved from the first processor to the second processor when the second processor shares a NUMA (non-uniform memory access) node with a home processor of the first virtual machine queue.

6. The method of claim 1 further comprising the step of determining whether a third processor is present.

7. The method of claim 6 further comprising the step of determining whether a third load further comprising a third virtual machine queue is present on the third processor moving the third virtual machine queue on the third processor to the second processor when the second processor is either a home processor of the third virtual machine queue or the second processor shares a NUMA (non-uniform memory access) node with the home processor.

8. A method of dynamically adjusting a network traffic queue associated with at least one virtual machine to processor mapping comprising the steps of:
    determining whether a first load comprising a first virtual machine queue associated with a first virtual machine is present on a first processor;
    determining whether the first load is below an upper threshold for processor load on the first processor;
    determining a first resulting load on a second processor based on the first virtual machine queue and a second load on the second processor;
    moving the first virtual machine queue to the second processor when the first load is below the upper threshold and the first resulting load does not exceed the upper threshold for the second processor, wherein the second processor is a next physically closest processor to an electronic path upon which the first virtual machine queue resides; and wherein the preceding steps are performed by at least one processor.

9. The method of claim 8 further comprising the steps of:
determining whether a first load further comprises a second virtual machine queue associated with a second virtual machine the second virtual machine being a different virtual machine from the first virtual machine;
determining a second resulting load on the second processor based on the second virtual machine queue and the second load;
determining if the second resulting load is below the upper threshold;
moving the second virtual machine queue to the second processor when the first load is below the upper threshold and the second resulting load does not exceed the upper threshold.

10. The method of claim 9 wherein the second virtual machine queue is moved to the second processor when the first virtual machine queue and second virtual machine queue share a common interrupt vector.

11. The method of claim 8 such that the first virtual machine queue is moved from the first processor to the second processor if the second processor is a home processor for the first virtual machine queue.

12. The method of claim 8 such that the first virtual machine queue is moved from the first processor to the second processor if the second processor shares a NUMA (non-uniform memory access) node with a home processor.

13. The method of claim 8 further comprising the step of determining whether a third processor is present.

14. The method of claim 13 further comprising the step of determining whether a third load further comprising a third virtual machine queue is present on the third processor and moving the third virtual machine queue on the third processor to the second processor when the second processor is either a home processor for the third virtual machine queue or the second processor shares a NUMA (non-uniform memory access) node with the home processor.

15. A method of dynamically adjusting a network traffic queue to processor mapping comprising the steps of:
determining whether a first load comprising a first virtual machine queue associated with a first virtual machine is present on a first processor wherein the first load exceeds an upper threshold for the first processor;
determining a first resulting load on a second processor based on the first virtual queue and a second load on the second processor wherein the second processor is a next physically closest processor to an electronic path upon which the first virtual machine queue resides;
moving the first virtual machine queue to the second processor when the first load exceeds the upper threshold, the first resulting load on the second processor does not exceed the upper threshold for the second processor, and the second processor is a home processor of the first virtual machine queue, or the second processor shares a NUMA (non-uniform memory access) node with the home processor,
determining whether the first load further comprises a second virtual machine queue associated with a second virtual machine;
determining a second resulting load on the second processor based on the second virtual machine queue and the second load;
moving the second virtual machine queue to the first processor when the second resulting load on the second processor does not exceed the upper threshold and the second processor is a home processor of the second virtual machine queue or shares a NUMA node with the home processor; and
wherein the preceding steps are executed by at least one processor.

16. The method of claim 15 further comprising the steps of:
determining whether the first load further comprises a third virtual machine queue associated with a third virtual machine;
determining a third resulting load on the second processor based on the third virtual machine queue on the first processor and the second resulting load on the second processor;
determining if the first load exceeds the upper threshold of the first processor and the second resulting load on the second processor is below the upper threshold;
moving the third virtual machine queue to the second processor when the first load on the first processor exceeds the upper threshold and the third resulting load does not exceed the upper threshold of the second processor.

17. The method of claim 15 further comprising the steps of:
determining a second resulting load on the second processor based on the second virtual machine queue and the second load;
determining if the first load on the first processor is below the upper threshold for the first processor;
determining whether the second resulting load on the second processor exceeds the upper threshold for the second processor;
moving the second virtual machine queue on the first processor to the second processor when the first load is below the upper threshold for the first processor and the second resulting load does not exceed the upper threshold for the second processor.

18. The method of claim 15 further comprising the step of determining whether a third processor is present.

19. The method of claim 18 further comprising the step of determining whether a third load further comprising a third virtual machine queue is present on the third processor.

20. The method of claim 19 further comprising the step of moving the third virtual machine queue on the third processor to the second processor if the second processor is either a home processor to the third virtual queue or the second processor shares a NUMA node with the home processor.

* * * * *